US008281682B2

(12) United States Patent
Ogura

(10) Patent No.: US 8,281,682 B2
(45) Date of Patent: Oct. 9, 2012

(54) ACCELERATOR OPERATING DEVICE

(75) Inventor: Takahiro Ogura, Odawara (JP)

(73) Assignee: Mikuni Corporation, Tokyo (JP)

( * ) Notice: Subject to any disclaimer, the term of this patent is extended or adjusted under 35 U.S.C. 154(b) by 525 days.

(21) Appl. No.: 12/591,093

(22) Filed: Nov. 6, 2009

(65) Prior Publication Data
US 2010/0107802 A1 May 6, 2010

(30) Foreign Application Priority Data

Nov. 6, 2008 (JP) ................................. 2008-284969

(51) Int. Cl.
B62M 25/04 (2006.01)
(52) U.S. Cl. ............................ 74/489; 180/219; 180/220
(58) Field of Classification Search .................... 74/488, 74/489, 502.2; 180/218, 219, 220
See application file for complete search history.

(56) References Cited

U.S. PATENT DOCUMENTS

| 5,438,889 | A  | * | 8/1995  | Tagawa .................... 74/473.14 |
| 5,481,934 | A  | * | 1/1996  | Tagawa .................... 74/473.14 |
| 5,934,149 | A  | * | 8/1999  | Tuda ........................ 74/502.2 |
| 6,003,639 | A  | * | 12/1999 | Buckley et al. ................. 188/26 |
| 6,012,353 | A  | * | 1/2000  | Kawakami .................... 74/502.2 |
| 6,377,016 | B1 | * | 4/2002  | Strong ........................ 318/653 |
| 6,553,862 | B1 | * | 4/2003  | Caple ........................ 74/502.2 |
| 6,647,823 | B2 | * | 11/2003 | Tsumiyama et al. ........ 74/501.6 |
| 6,647,824 | B2 | * | 11/2003 | Watarai ..................... 74/502.2 |
| 6,675,672 | B2 | * | 1/2004  | Ose ........................... 74/502.2 |
| 6,848,335 | B1 | * | 2/2005  | Kawakami ................. 74/502.2 |
| 6,892,603 | B2 | * | 5/2005  | Barnett ...................... 74/502.2 |
| 6,978,694 | B2 | * | 12/2005 | Peppard ........................ 74/489 |
| 7,503,236 | B2 | * | 3/2009  | Schlabach ..................... 74/513 |
| 7,849,764 | B2 | * | 12/2010 | Kua ........................... 74/502.2 |
| 7,918,145 | B1 | * | 4/2011  | Calendrille, Jr. ........... 74/502.2 |
| 8,051,939 | B2 | * | 11/2011 | Kondo et al. ................. 180/219 |
| 2004/0040402 | A1 | * | 3/2004 | Tsumiyama et al. ........ 74/501.6 |
| 2004/0216550 | A1 | * | 11/2004 | Fallak et al. ................. 74/551.9 |
| 2005/0204847 | A1 | * | 9/2005 | Barnett ........................ 74/488 |
| 2006/0169096 | A1 | * | 8/2006 | Barnett ...................... 74/551.8 |
| 2008/0047768 | A1 | * | 2/2008 | Cross ........................... 180/218 |
| 2008/0264197 | A1 | * | 10/2008 | Shahana ..................... 74/502.2 |
| 2009/0114051 | A1 | * | 5/2009 | Miki ............................ 74/489 |
| 2010/0107802 | A1 | * | 5/2010 | Ogura ........................... 74/491 |
| 2010/0126299 | A1 | * | 5/2010 | Baldassari et al. ............. 74/491 |

FOREIGN PATENT DOCUMENTS
EP 1338502 * 8/2003
JP 2003-252274 9/2003
* cited by examiner Primary Examiner — Troy Chambers
Assistant Examiner — Gregory Prather

(57) ABSTRACT

An accelerator operating device including a body fixed to a handlebar; an accelerator lever supported on the body so as to rotate freely around a predetermined axial line and that rotates between a close position and a maximum open position; a first return spring that returns the accelerator lever to the close position; and a load generation mechanism that generates a load on a rotational operating force of the accelerator lever by frictional resistance. The load generating mechanism includes a rotational slider arranged to freely rotate around the axial line that can be pressed and rotated by opening rotation of the accelerator lever; a slide receiving part formed in the body that allows the rotational slider to slide; a biasing spring that biases the rotational slider toward the slide receiving part; and a second return spring that returns the rotational slider to a rest position.

10 Claims, 11 Drawing Sheets

ACCELERATOR OPERATING DEVICE

CROSS-REFERENCE TO RELATED APPLICATIONS

This application is based upon and claims the priority benefit of Japanese Application No. 2008-284969, filed Nov. 6, 2008, in the Japanese Intellectual Property Office, the disclosure of which is incorporated herein by reference.

BACKGROUND

1. Field

The present invention relates to an accelerator operating device provided on the handle of a two-wheeled vehicle and the like, and more particularly relates to an accelerator operating device employing a drive-by-wire system.

2. Description of the Related Art

A well-known conventional accelerator operating device includes: a dual partitioned case installed on the handlebar; a throttle grip installed to rotate freely on the end of the handlebar; a gear mechanism containing a drive gear and a detection gear that are included in the case and rotate around the handlebar; a tube guide that is arranged to freely rotate around the handlebar and transmits the rotation of the throttle grip to the drive gear; a return spring that biases the drive gear to rotate in one direction; a throttle degree opening sensor that detects the rotational angle of the detection gear included in the gear mechanism; a ring-shaped plate case arranged in the case and around the handlebar; a ring-shaped friction plate fit in the plate case; and a plurality of coil springs that are fit in the plate case and biases the friction plate toward the thrust end surface of the drive gear (for example, refer to Japanese Patent Application Laid-open No. 2003-252274).

In this accelerator operating device, the degree of throttle opening is detected by the throttle degree opening sensor based on rotation of the drive gear and the detection gear corresponding to the rotation of the throttle grip, and the plurality of coil springs and friction plate generate a fixed rotational load (operating load) and cancel an unpleasant feeling during operation.

Nonetheless, the above accelerator operating device requires a plurality of coil springs to apply pressure on the friction plate as the load generation mechanism that generates load on the rotational operating force, and therefore, the structure is complicated, and tasks such as assembly and maintenance are laborious.

Moreover, if sticking or the like occurs between the friction plate and the drive gear, there is the risk that the throttle grip will not return to the rest position (throttle closed angle position).

Further, regarding rotational operating force of the throttle grip, even if a constant frictional force (load) can be generated in addition to the counterforce of the return spring, the hysteresis characteristics of the rotational operating force cannot be changed by increasing or decreasing the frictional force (load) corresponding to the increase of the opening angle of the throttle grip.

SUMMARY

In view of the above circumstances of the conventional device described above, an aspect of the present invention is to provide an accelerator operating device by which, while making the assembly and maintenance tasks easier by simplifying the structure, miniaturizing, and reducing the number of parts, unpleasant feeling can be resolved by exerting a desirable load on the rotational operating force; hysteresis characteristics can be provided to the rotational operating force corresponding to the opening rotation and closing rotation; and failsafe functions can be further guaranteed.

Additional aspects and/or advantages will be set forth in part in the description which follows and, in part, will be apparent from the description, or may be learned by practice of the invention.

The foregoing and/or other aspects of the present invention are achieved by providing an accelerator operating device including a body to be fixed to a handlebar; an accelerator lever that is supported on the body so as to rotate freely around a predetermined axial line and that rotates between a close position and a maximum open position; a first return spring that returns the aforementioned accelerator lever to the close position; and a load generation mechanism that generates a load on a rotational operating force of the aforementioned accelerator lever by frictional resistance, wherein the load generating mechanism includes a rotational slider that is arranged to freely rotate around the axial line and that can be pressed and rotated by opening rotation of the accelerator lever; a slide receiving part that is formed in the body and that makes contact with and allows the rotational slider to slide; a biasing spring that biases the rotational slider toward the aforementioned slide receiving part; and a second return spring that returns the rotational slider to a rest position corresponding to the close position.

According to this configuration, when the accelerator lever is rotated from the close position to the maximum open position, a load acts, in which the frictional force when the rotational slider is slid over the slide receiving part is applied in addition to the counterforce of the return spring, while on the other hand, when the accelerator lever returns to the original close position, the biasing force of the return spring acts as a load, and therefore, a rotational operating force can be obtained which has large hysteresis characteristics during opening rotation and small hysteresis characteristics during closing rotation. As the result, the operator can operate the accelerator without an unpleasant feeling.

Moreover, in the maximum opening position or in other opening positions, even if sticking of the rotational slider occurs, the biasing force of the first return spring causes the accelerator lever to reliably return to the original close position, and therefore a fail safe function can be guaranteed.

Further, the structure can be simplified, the device can be made compact, and the assembly and maintenance tasks can be easily conducted by employing a load generating mechanism configuration with a small number of parts that includes the rotational slider, slide receiving part, biasing spring, and second return spring.

With the above configuration, a configuration can be employed in which the rotational slider includes a pair of rotational sliders that are arranged mutually opposing in the axial direction and that contact the slide receiving part in the axial direction, and the slide receiving part is formed so as to change the gap between the pair of rotational sliders in accordance with the opening rotation and closing rotation of the accelerator lever.

According to this configuration, the rotation operating force (slant characteristics of the load and the like) can be set as necessary. For example, by forming the slide receiving part such that the gap between the pair of rotational sliders is made to increase corresponding to the rotation from the close position to the maximum open position, the increased portion of load when the accelerator lever rotations from the close position toward the maximum open position can be made gradually smaller and the maximum load can be controlled.

With the above configuration, a configuration can be employed in which the accelerator lever includes a rotational spindle that rotates integrally and demarcates the axial line, and the first return spring and second return spring are torsion springs respectively arranged around the rotational spindle.

According to this configuration, the first return spring and the second return spring are arranged around a common rotational spindle, and therefore the structure can be simplified, the device can be made compact, and the desired characteristics for the torque that acts around the rotational spindle can be easily set.

With the above configuration, a configuration can be employed which includes a degree opening sensor that detects the degree of opening of the accelerator lever, wherein the opening degree sensor includes: a moveable part that rotates integrally with the rotational spindle, and a securing part that is fixed to the body.

According to this configuration, relative movement with the fixed part is generated when the moveable parts rotate together with the accelerator lever (rotational spindle). The degree of opening of the accelerator lever can be detected by signals corresponding to this relative rotational movement (a contact system uses the current value based on changes such as electric resistance corresponding to the rotational angle; or a non-contact magnetic system uses the voltage value or the like based on changes such as the density of magnetic flux corresponding to the rotational angle).

With the above configuration, a configuration can be employed in which the biasing spring is a compression coil spring, one of the pair of rotational sliders has a guide spindle that mates with the coil spring, and the other of the pair of rotational sliders has a through hole into which the tip part of the guide spindle can be inserted.

According to this configuration, passing the coil spring through the guide spindle can prevent the coil spring from falling out, and the pair of rotational sliders can rotate together by inserting the tip of the guide spindle into the through hole.

With the above configuration, a configuration can be employed in which the slide receiving part has a convex part onto which the rotational slider advances to locally increase the rotational manipulation force.

According to this configuration, a click load (a load equivalent to the kick down load of an accelerator pedal) can be generated when the rotational slider has ridden up on the convex part. The driver is thereby encouraged to be cautious, and there are the effects of improved fuel savings and cleaner exhaust gas.

Further, it is possible to adopt a configuration that one of the pair of rotational sliders includes a first inclined surface having a predetermined angle against the sliding direction and the other of the pair of rotational sliders includes a second inclined surface being contacted to the first inclined surface, the pair of rotational sliders includes a pair of sliding parts that are respectively contacted to the slide receiving part, and the pair of sliding parts are configured that distance therebetween becomes large due to relative movement of the first inclined surface and the second inclined surface in opening rotation direction in accordance with the rotation of the pair of rotational sliders being pressed by the opening rotation of the accelerator lever.

According to this configuration, since the first inclined surface and the second inclined surface are relatively moved by the opening rotation of the accelerator lever, the friction force between the slide receiving part and the pair of rotational sliders varies. Thus, the hysteresis can be controlled with a simple configuration without arranging a biasing spring to press the rotational sliders toward the slide receiving part. Then, when the accelerator lever rotates in the direction to return to the rest position, the first inclined surface and the second inclined surface are to be in the positional relation by the second return spring before the relative movement occurs. Accordingly, the friction force with the slide receiving part disappears and large hysteresis characteristics can be obtained.

According to the accelerator operating device of the above configuration, it is possible to obtain an accelerator operating device by which, while making the assembly and maintenance tasks easier by simplifying the structure, miniaturizing, and reducing the number of parts, unpleasant feeling can be resolved by exerting a desirable load on the rotational operating force; hysteresis characteristics can be provided to the rotational operating force corresponding to the opening rotation and closing rotation; and failsafe functions can be further guaranteed.

BRIEF DESCRIPTION OF DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
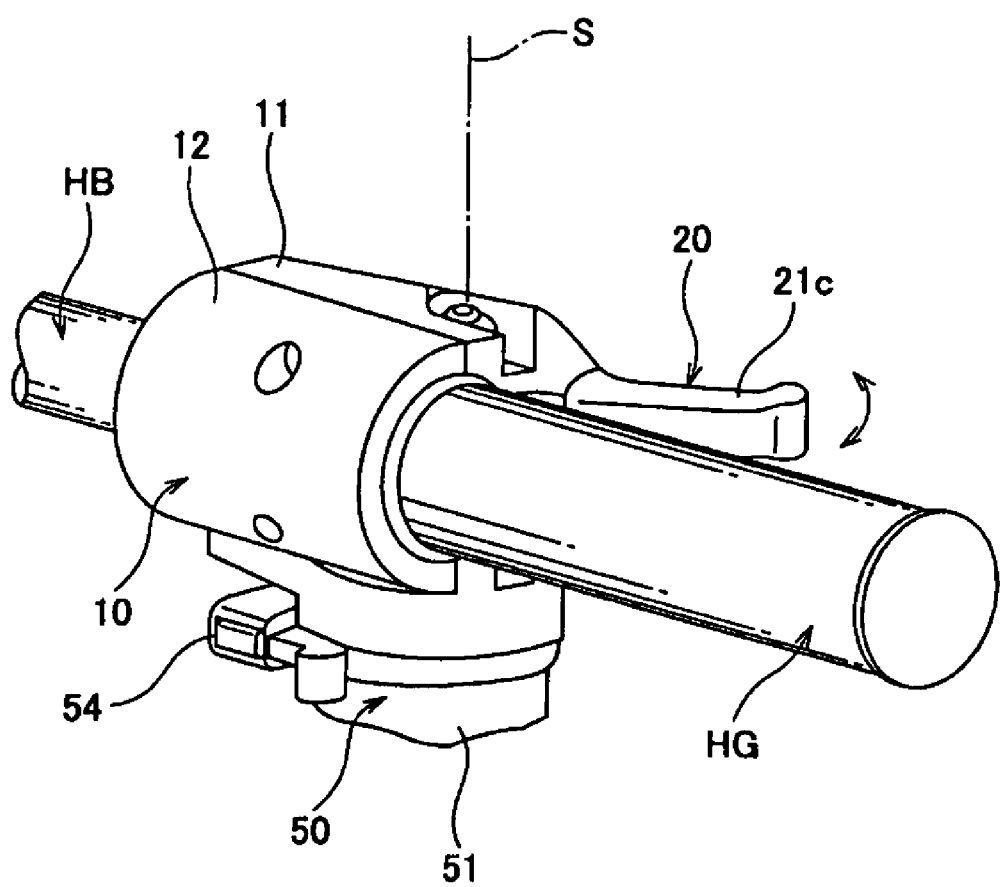
FIG. 1 is a perspective view diagram indicating an accelerator operating device mounted on the handlebar of a two-wheeled vehicle.

Reference will now be made in detail to the embodiments, examples of which are illustrated in the accompanying drawings, wherein like reference numerals refer to the like elements throughout. The embodiments are described below to explain the present invention by referring to the figures.

Figure 2:
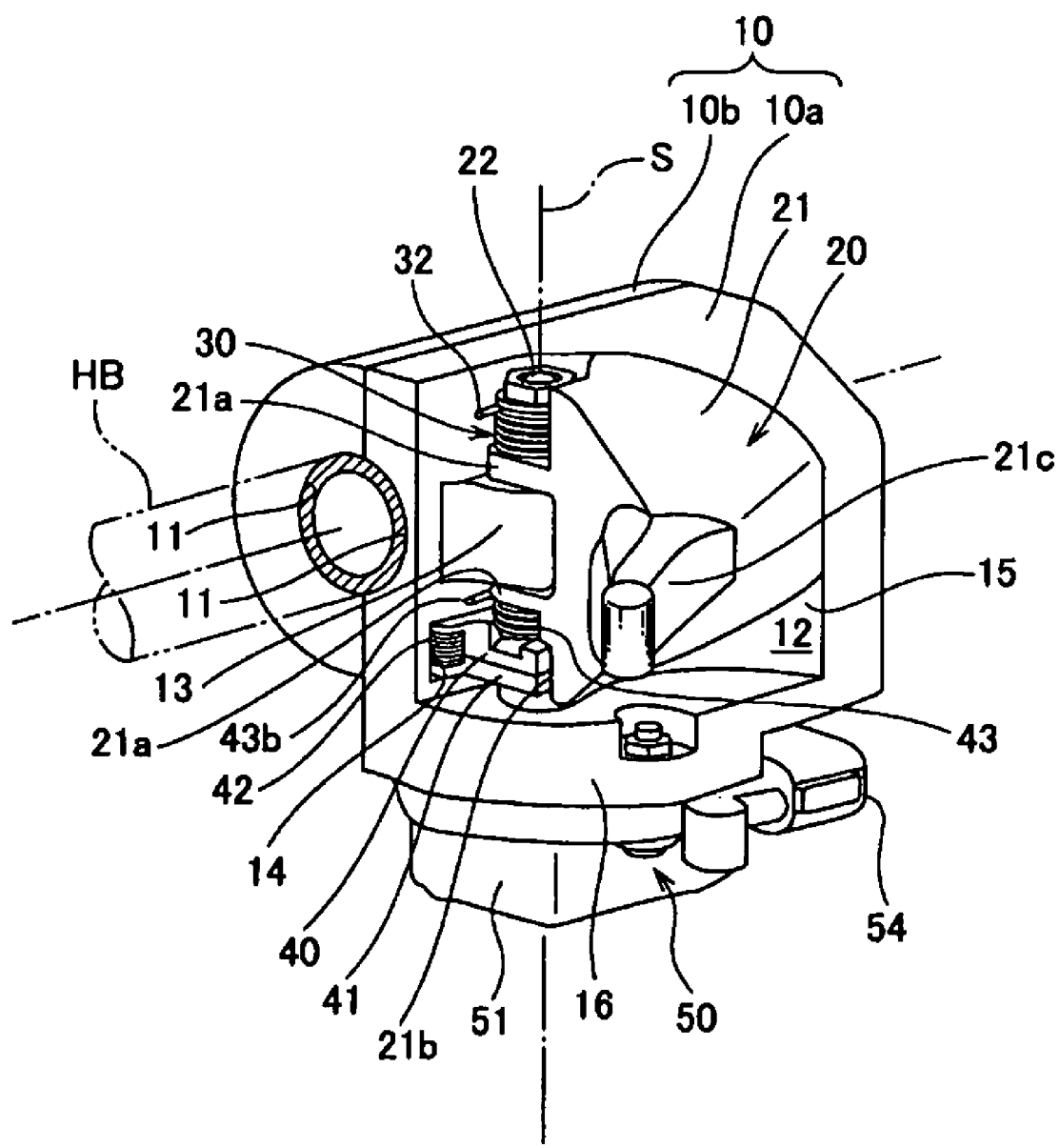
FIG. 2 is a perspective view diagram indicating the accelerator operating device indicated in FIG. 1.
Figure 3:
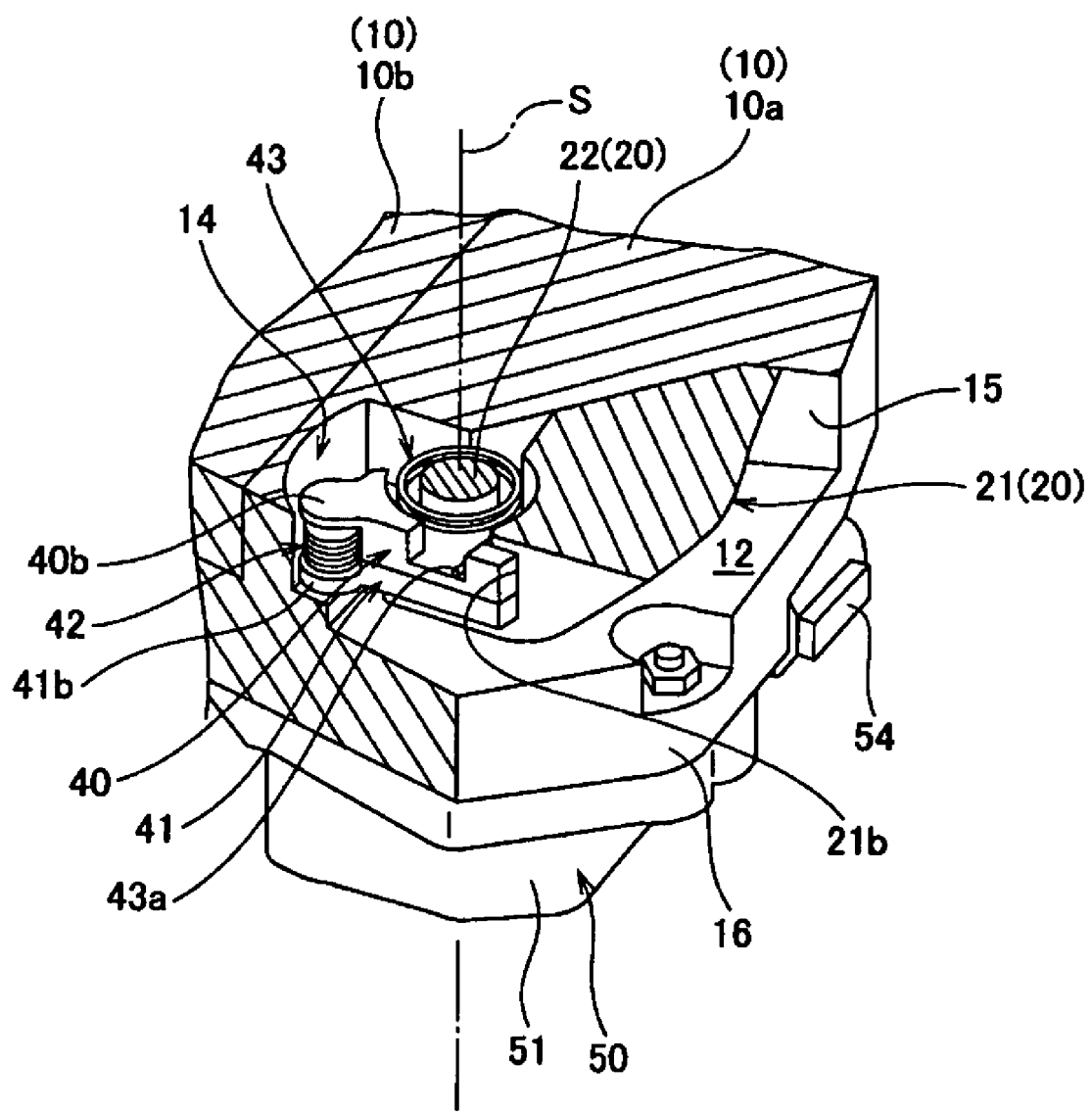
FIG. 3 is a perspective view cross-sectional diagram indicating the accelerator operating device indicated in FIG. 1.
Figure 4:
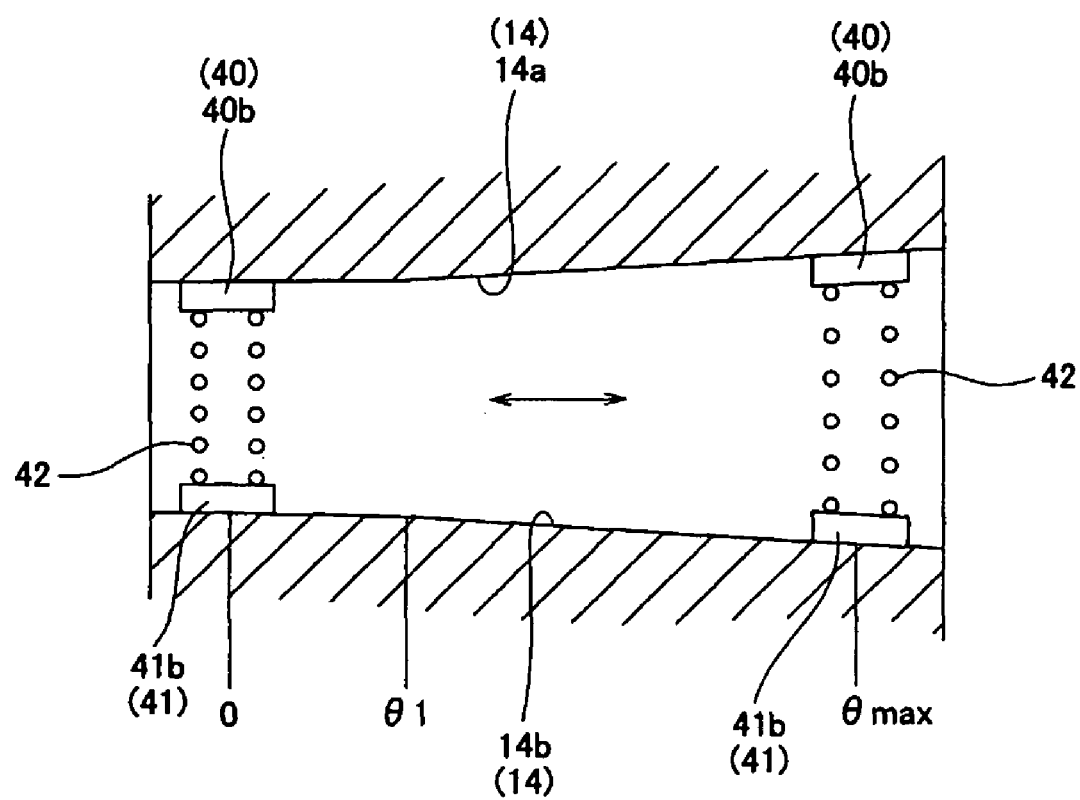
FIG. 4 is a longitudinal cross-sectional diagram indicating the accelerator operating device indicated in FIG. 1.
Figure 5:
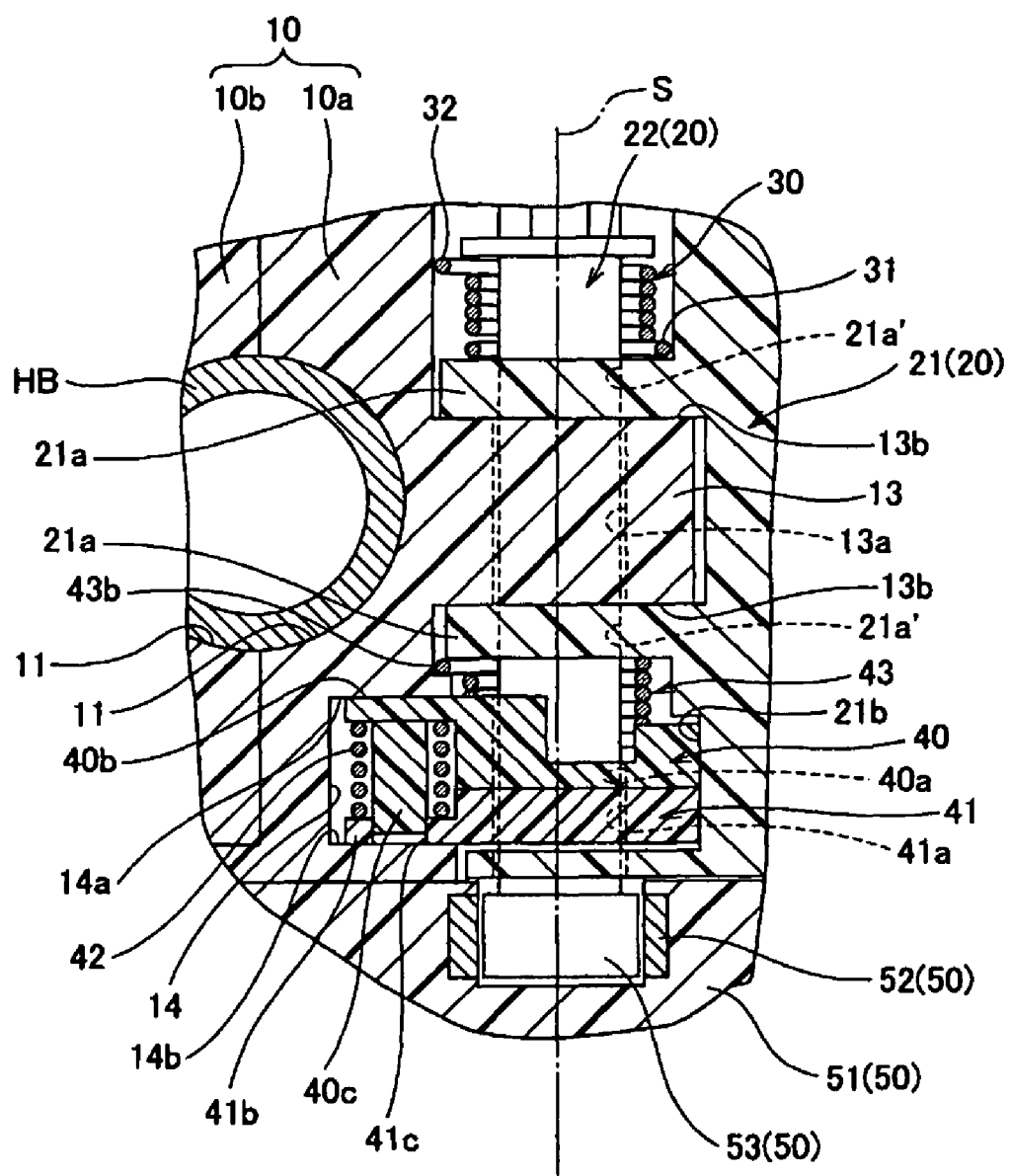
FIG. 5 is a schematic diagram indicating the load generating mechanism included in the accelerator operating device indicated in FIG. 1.
Figure 6:
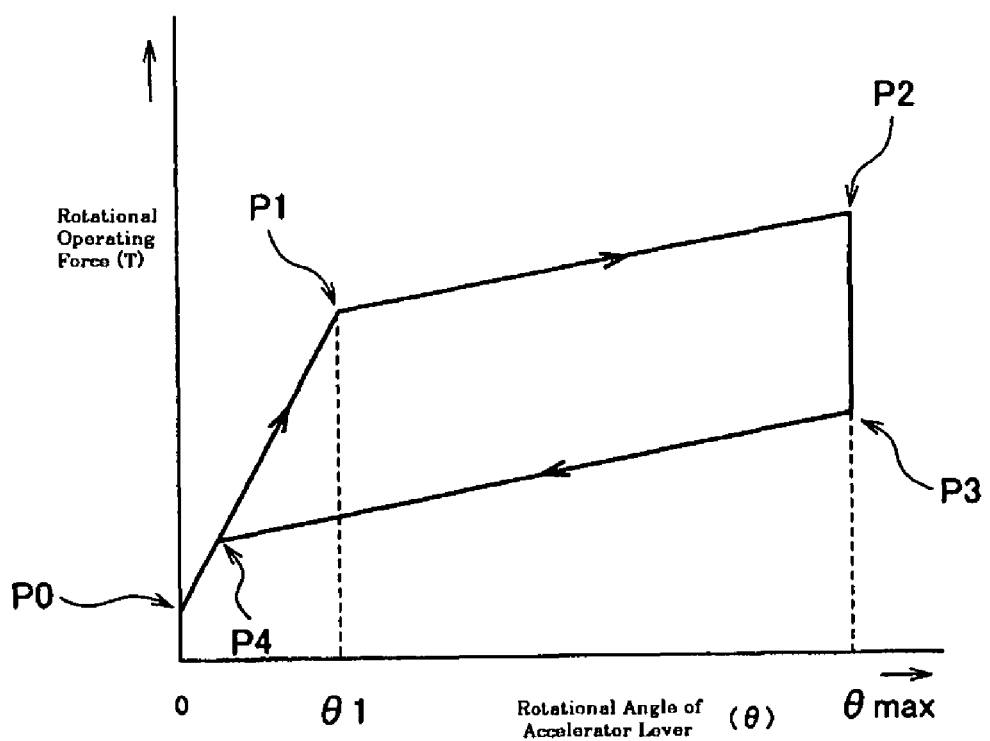
FIG. 6 is a schematic diagram indicating the characteristics of the rotational operating force of the accelerator lever included in the accelerator operating device indicated in FIG. 1.

FIG. 1 to FIG. 6 indicate one embodiment of an accelerator operating device. FIG. 1 is perspective view indicating the accelerator operating device mounted on a two-wheeled vehicle; FIG. 2 is a perspective view of the accelerator operating device; FIG. 3 is cross-sectional perspective view indicating the interior of the accelerator operating device; FIG. 4 is a longitudinal cross-section indicating the interior of the accelerator operating device; FIG. 5 is a schematic diagram indicating the load generating mechanism included in the accelerator operating device; and FIG. 6 is a characteristics diagram indicating the characteristics of the rotational operating force of the accelerator lever.

As indicated in FIG. 1, this accelerator operating device is mounted on the handlebar HB to the inside of the hand grip HG of a two-wheeled vehicle, and includes: a body 10 that is fixed to the handlebar HB; an accelerator lever 20, which is supported on the body 10 to free rotate around a predetermined axial line S and which rotates between the close position and the maximum open position; a first return spring 30 that returns the accelerator lever 20 to the close position; a pair of rotational sliders 40 and 41, a biasing spring 42 and a second return spring 43, which are a part of the load generating mechanism that generates a load by frictional resistance on the rotational operating force of the accelerator lever 20; and an opening sensor 50 for detecting the degree that the accelerator lever 20 is open (including a cover 51, a securing part 52, a moveable part 53, and a connector 54).

As indicated in FIG. 1 to FIG. 4, the body 10 is formed by two half bodies 10a and 10b, and is fixed to the handlebar HB by mutually closing the half bodies 10a and 10b together using bolts with the handlebar HB enclosed inside.

As indicated in FIG. 2 to FIG. 4, the body 10 includes two semi-cylindrical surfaces 11 that receive the handlebar HB inside; a concave part 12 in which the accelerator lever 20 is arranged; a support part 13 formed to protrude from the side wall that demarcates the concave part 12; a slide receiving part 14 formed by cutting away the side wall that demarcates the concave part 12; a stopper wall 15 that is formed by the side wall that demarcates the concave part 12 and that stops the accelerator lever 20 at the close position; and a flange part 16 on which is assembled the cover 51 of the opening sensor 50.

The concave part 12 is formed in a shape that permits the accelerator lever 20 to rotate from the close position to the maximum open position.

The support part 13 protrudes horizontally from the side wall that demarcates the concave part 12, and is formed so as to demarcate the spindle receiving hole 13a, which passes through in the axial line S direction, and the two flat end surfaces 13b at both ends in the axial line S direction.

As indicated in FIG. 2, the stopper wall 15 is formed by the side wall that demarcates the concave part 12, and determines the position at which the accelerator lever 20 stops in the close position (rest position).

As indicated in FIG. 2 and FIG. 3, the flange part 16 is formed such that the cover 51 of the rotational sensor 50 is fixed using a bolt and a nut.

The slide receiving part 14 is formed by cutting away the side wall that demarcates the concave part 12, and demarcates slide surfaces 14a and 14b on which the pair of rotational sliders 40 and 41 respectively slide.

The slide surfaces 14a and 14b are formed mutually opposing in the axial line S direction, and as indicated in FIG. 5, are formed such that there is a fixed gap in the region from the close position (0) to rotational angle θ1 and a gradual increasingly large gap is formed in the region from rotational angle θ1 to the maximum open position (θ max) in conjunction with opening rotation.

In this way, the slide receiving part 14 is formed such that the gap between the pair of rotational sliders 40 and 41 changes corresponding to the opening rotation and closing rotation of the accelerator lever 20, and therefore, the rotational operating force (slant characteristics of the load, and the like) can be suitably set as necessary.

Specifically, as indicated in FIG. 5, by forming the slide receiving part 14 such that the gap increases between the pair of rotational sliders 40 and 41, the maximum load can be controlled by gradually decreasing the amount of load increase corresponding to the rotation from the close position to the maximum open position of the accelerator lever 20, and a preferable rotational operating force can be obtained.

As indicated in FIG. 1 to FIG. 4, the accelerator lever 20 includes a lever main body 21, and a rotational spindle 22 that rotates integrally with the lever main body 21 and that demarcates the axial line S.

As indicated in FIG. 2 and FIG. 4, the lever main body 21 includes two connecting parts 21a that are formed so as to enclose the support part 13 inside in the axial line S direction, a concave part 21b that receives the pair of rotational sliders 40 and 41 so as to rotate freely, and a operating part 21c that the operator (driver) operates.

As indicated in FIG. 4, the connecting part 21a is formed so as to demarcate a connecting hole 21a', through which the rotational spindle 22 passes and rotates integrally with the rotational spindle 22.

As indicated in FIG. 4, the concave part 21b is formed to receive the pair of rotational sliders 40 and 41 moveably in a predetermined range in the axial line S direction, to press on and rotate together with the pair of rotational sliders 40 and 41 when the accelerator lever 20 is rotating open, and to be able to separate from the pair of rotational sliders 40 and 41 and rotate freely when the accelerator lever 20 is rotating closed.

Then, by arranging the support part 13 to be enclosed between the two connecting parts 21a of the lever main body 21 and by passing the rotational spindle 22 through the connecting hole 21a' and the spindle receiving hole 13a, the acceleration lever 20 is supported to rotate freely around the axial line S in relation to the body 10.

As indicated in FIG. 2 and FIG. 4, the first return spring 30 is a torsion spring, and is arranged around the rotational spindle 22 in the upper region of the rotational spindle 22; one end 31 is retained by the lever main body 21 of the accelerator lever 20, and the other end 32 is retained by the side wall where the concave part 12 of the body 10 is demarcated. The first return spring 30 exerts rotational biasing force such that the accelerator lever 20 returns to the close position (rest position).

As indicated in FIG. 2 to FIG. 4, the pair of rotational sliders 40 and 41 are mutually opposing in the axial line S direction, and are arranged in the concave part 21b of the lever main body 21 and the slide receiving part 14 of the body 10 so as to be able to move freely relative to the axial line S direction and to rotate integrally around the rotational spindle 22 (axial line S).

As indicated in FIG. 2 to FIG. 4, the rotational slider 40 is formed in a roughly flat lever shape that extends perpendicularly to the axial line S, and includes: a through hole 40a through which the rotational spindle 22 passes; a slide part 40b that contacts and slides in the axial line S direction on the slide surface 14a of the slide receiving part 14; and guide spindle 40c through which the biasing spring 42 passes.

The sliding part 40b is formed in a thin plate shape to allow elastic deformation, and can slide by making close contact with the slide surface 14a of the slide receiving part 14 based on the biasing force of the biasing spring 42.

As indicated in FIG. 2 to FIG. 4, the other rotational slider 41 is formed in a roughly flat lever shape that extends perpendicularly to the axial line S, and includes: a through hole 41a through which the rotational spindle 22 passes; a slide part 41b that contacts and slides in the axial line S direction on the slide surface 14b of the slide receiving part 14; and guide spindle 41c into which the tip part of the guide spindle 40c can be inserted.

The sliding part 41b is formed in a thin plate shape to allow elastic deformation, and can slide by making close contact with the slide surface 14b of the slide receiving part 14 based on the biasing force of the biasing spring 42.

Here, the rotational slider 40 has a guide spindle 40c that mates with the biasing spring 42 and the other rotational slider 41 has a through hole 41c that receives the tip part of the guide spindle 40c, and therefore the guide spindle 40c passing through the biasing spring 42 can prevent the biasing spring 42 from falling out, and the pair of rotational sliders 40 and 41 can rotate together by inserting the tip part of the guide spindle 40c into the through hole 41c.

As indicated in FIG. 4, the biasing spring 42 is a compression coil spring, and in the compressed state with a predetermined compression allowance mates around the guide spindle 40c and in between the pair of rotational sliders 40 and 41 (sliding parts 40b and 41b). Then the biasing spring 42 exerts biasing force such that the sliding part 40b of the rotational slider 40 is pressed onto the sliding surface 14a of the slide receiving part 14, and exerts biasing force such that the sliding part 41b of the other rotational slider 41 is pressed onto the sliding surface 14b of the slide receiving part 14.

As indicated in FIG. 2 to FIG. 4, the second return spring 43 is a torsion spring and is arranged around the rotational spindle 22 in the lower region of the rotation spindle 22 (between the rotational slider 40 and the connecting part 21a of the lever main body 21); and one end 43a is retained by the rotational slider 40 and the other end 43b is retained by the side wall where the concave part 12 of the body 10 is demarcated.

Then, the second return spring 43 exerts rotational biasing force such that the pair of rotational sliders 40 and 41 return to the rest position corresponding to when the accelerator lever 20 is positioned in the close position, specifically, such that the accelerator lever 20 returns to the close position (rest position) through the pair of rotational sliders 40 and 41.

In the above configuration, the load generating mechanism that generates a load based on the frictional resistance to the rotational operating force of the accelerator lever 20 is configured by: the pair of rotational sliders 40 and 41, which can rotate by being pressed by the opening rotation of the accelerator lever 20; the slide receiving part 14 that is formed in the body 10 and allows contact with and sliding of the pair of rotational sliders 40 and 41 in the axial line S direction; the biasing spring 42 that is between the pair of rotational sliders 40 and 41 and exerts biasing force toward the slide receiving part 14; and the second return spring 43 that returns the pair of rotational sliders 40 and 41 to the rest position corresponding to the close position.

In this way, by employing a configuration with few parts that include the pair of rotational sliders 40 and 41, the slide receiving part 14, the biasing spring 42, and the second return spring 43, it is possible to simplify the structure of the load generating mechanism, to make a compact device, and to make device assembly and maintenance tasks easy.

Moreover, in the above configuration, the first return spring 30 and the second return spring 43 respectively are torsion springs and are arranged in common around the rotational spindle 22, and therefore, the structure can be simplified, the device made compact, and the torque that acts around the rotational spindle 22 can be easily set to the desired characteristics.

The opening sensor 50 is a non-contact type magnetic sensor, and as indicated in FIG. 4, includes a cover 51 that is fixed to the body 10 and can be freely assembled and disassembled, a securing part 52 that is embedded in the cover 51, a moveable part 53 that is fixed to the lower end of the rotational spindle 22 and rotates integrally with the rotational spindle 22, and a connector 54 that is formed in the cover 51.

The cover 51 is connected to a flange part 16 of the body 10 using a bolt and nut.

The securing part 52 is embedded in the cover 51, and is configured by a hole element that outputs electric signals corresponding to changes of magnetic flux density, and a stator composed of magnetic material forming a magnetic circuit.

The moveable part 53 is arranged inside of the securing part 52, and is configured by an armature composed of magnetic material that rotates as a single body with the rotational spindle 22, specifically, with the accelerator lever 20, and by a permanent magnet connected to the armature.

The connector 54 is formed such that a terminal that leads from the hole element is exposed, and is electrically connected to the outside.

According to this opening sensor 50, relative movement between the securing part 52 occurs when the moveable part 53 rotates together with the accelerator 20 (rotational spindle 22). Then, electrical signals are output based on the changes in magnetic flux density corresponding to this relative rotational angle, and the degree of opening of the accelerator 20 is detected.

Next, the operation of the above accelerator operating device will be explained while referring to FIG. 5 and FIG. 6.

First, when the accelerator lever 20 is in the close position (rest position), the accelerator 20 contacts and is stopped by the stopper wall 15 of the body 10.

From this state, when the operator rotates the accelerator lever 20 open toward the maximum opening position, in addition to the counter force of the first return spring 30 and the second return spring 43, there is the action of the load in which frictional force is added when the pair of rotational sliders 40 and 41 slide on the slide receiving part 14 (slide surfaces 14a and 14b). As indicated in FIG. 5 and FIG. 6, the action of this frictional force is constant in the region where the rotation angle $\theta$ is 0 to $\theta1$, and gradually decreased in the region from $\theta1$ to $\theta$max. Then, the rotational operating force following the route indicated by P0→P1→P2 in FIG. 6 is required for the opening rotation.

Meanwhile, when the operator rotates to close the accelerator lever 20 from the maximum opening position to the original close position (rest position), the rotational operating force following the route indicated by P3→P4→P1 in FIG. 6 is required.

In this way, the operator can operate the accelerator without an unpleasant feeling because the rotational operating force is set to have large hysteresis characteristics during opening rotation and small ones during closing rotation.

Moreover, if the pair of rotational sliders 40 and 41 are sticking in the maximum opening position or in other opening positions and have not returned to the rest position, a fail safe function can be guaranteed because the biasing force of the first return spring 30 reliably returns the accelerator lever 20 to the original close position.

As described above, according to this accelerator operating device, while making the assembly and maintenance tasks easier by simplifying the structure, miniaturizing, and reducing the number of parts, unpleasant feeling can be resolved by exerting a desirable load on the rotational operating force; hysteresis characteristics can be provided to the rotational operating force corresponding to the opening rotation and closing rotation; and failsafe functions can be further guaranteed.

Figure 7:
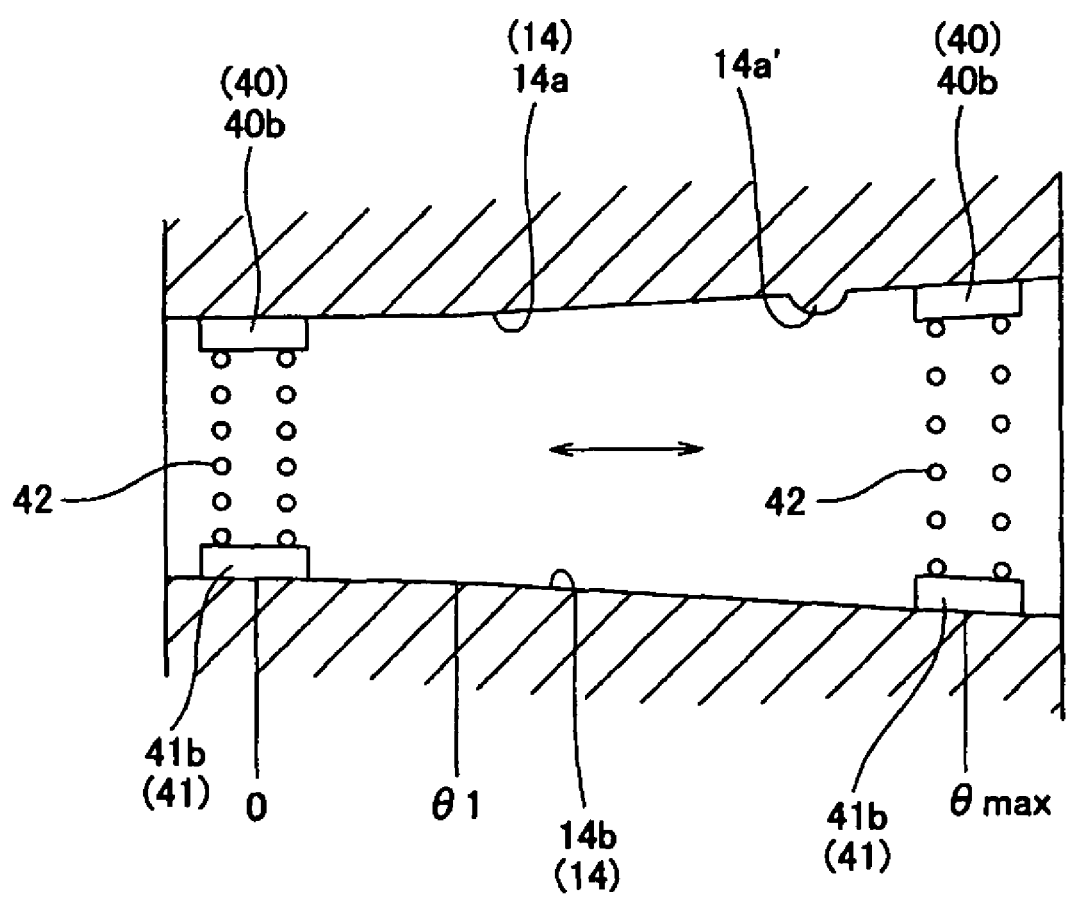
FIG. 7 indicates another embodiment of an accelerator operating device, and is a schematic diagram indicating the load generating mechanism.
Figure 8:
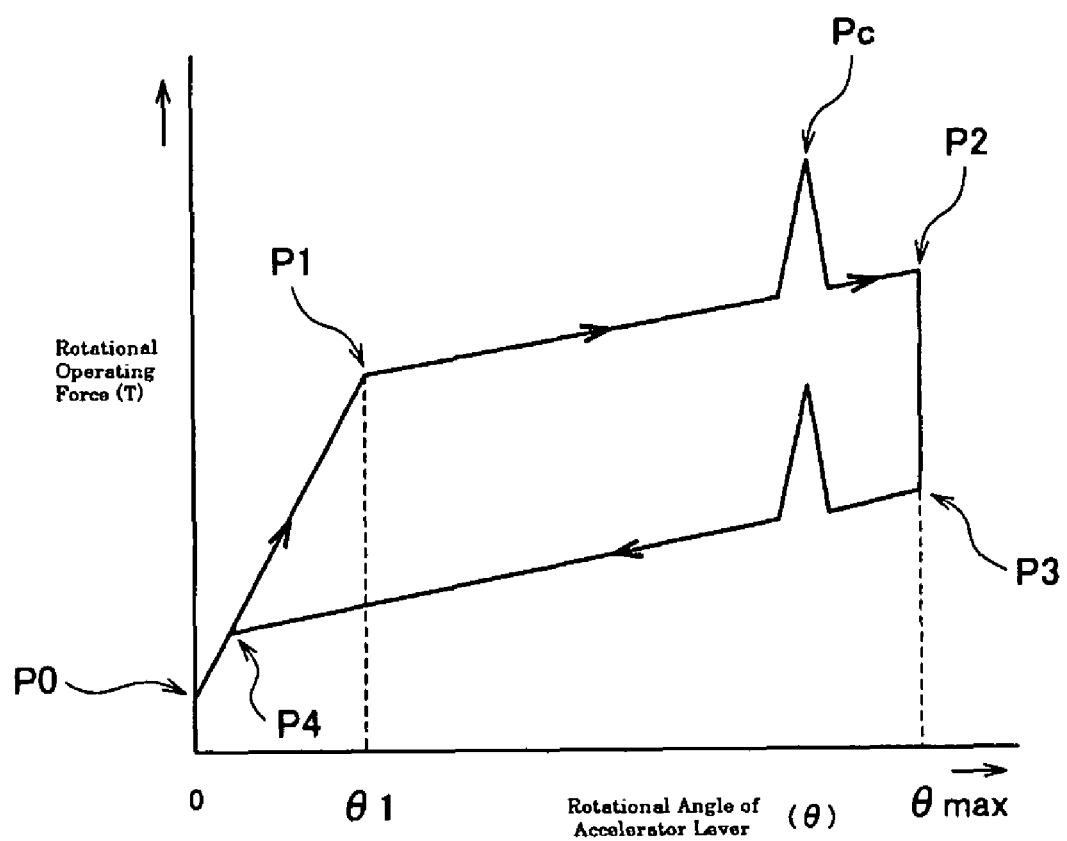
FIG. 8 is a characteristics diagram indicating the characteristics of the rotational operating force of the accelerator lever included in the accelerator operating device indicated in FIG. 7.

FIG. 7 and FIG. 8 indicate another embodiment of an accelerator operating device. FIG. 7 is a schematic diagram indicating the load generating mechanism included in the accelerator operating device; and FIG. 8 is a characteristics diagram indicating the characteristics of the rotational operating force of the acceleration lever 20.

In this embodiment, other than the addition of the convex part 14a' to the slide surface 14a of the slide receiving part 14, everything is the same as in the previously described embodiment, and therefore, the same reference numerals will be applied to the same configurational elements, and explanations thereof will be omitted.

Specifically, as indicated in FIG. 7, in this embodiment a convex part 14a', onto which the rotational slider 40 advances, is formed on the slide surface 14a of the slide receiving part 14.

According to this, as indicated at point Pc in FIG. 8, when the rotational slider 40 advances onto the convex part 14a', a click load can be generated which locally increases the rotational operating force (load equivalent to the kick down load of an accelerator pedal).

The local increase of rotational operating force can thereby give the operator a real feeling of the sensation of causing the accelerator lever 20 to rotate to the maximum open position.

As previously described, according to the accelerator operating device of this embodiment, while making the assembly and maintenance tasks easier by simplifying the structure, miniaturizing, and reducing the number of parts, unpleasant feeling can be resolved by exerting a desirable load on the rotational operating force; hysteresis characteristics can be provided to the rotational operating force corresponding to the opening rotation and closing rotation; and failsafe functions can be further guaranteed.

Figure 10:
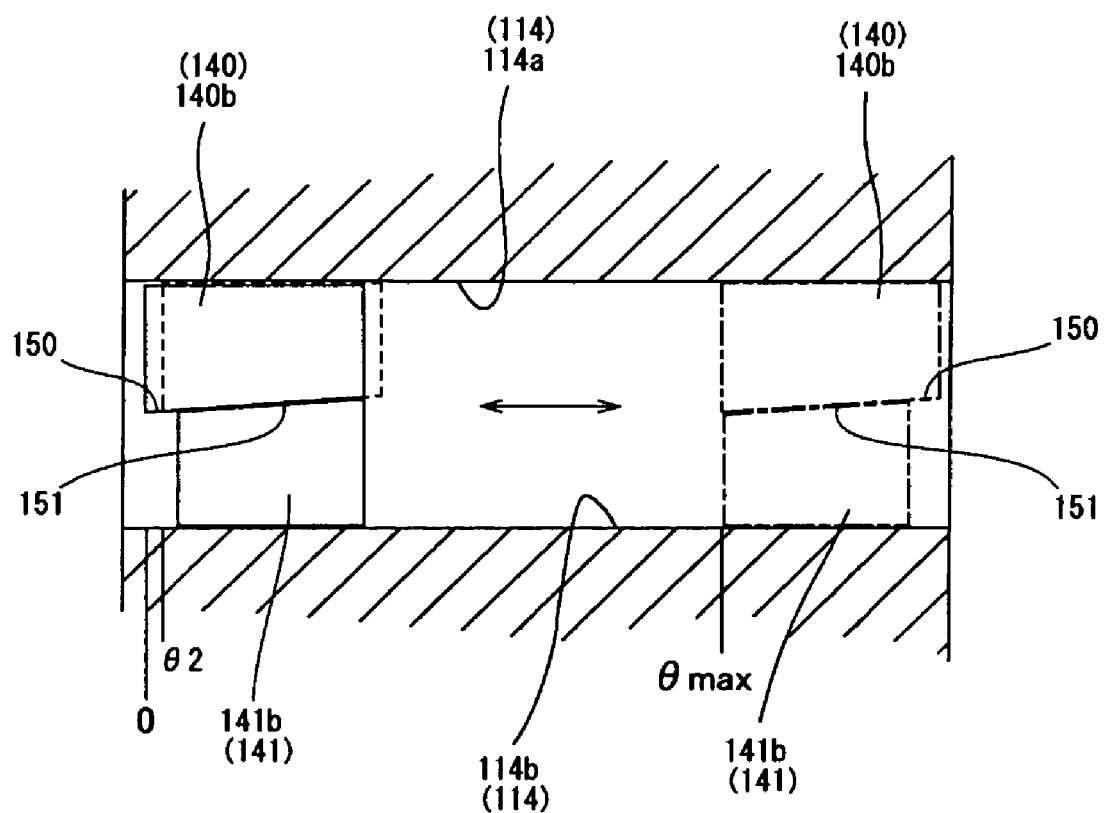
FIG. 10 is a schematic diagram indicating the load generating mechanism included in the accelerator operating device indicated in FIG. 9.
Figure 11:
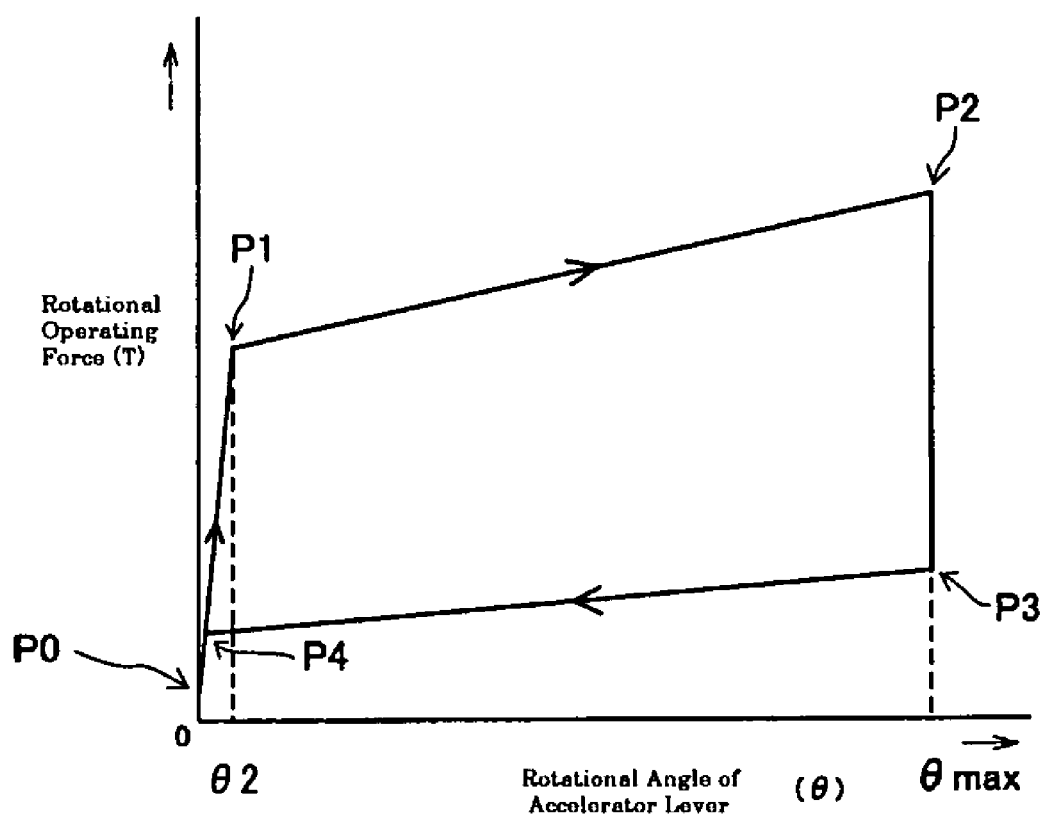
FIG. 11 is a characteristics diagram indicating the characteristics of the rotational operating force of the accelerator lever included in the accelerator operating device indicated in FIG. 9.

Another embodiment of the accelerator operating device will be described with reference to FIGS. 9 to 11. The same numerals are given to the same elements of the abovementioned embodiment and description will not be repeated.

Figure 9:
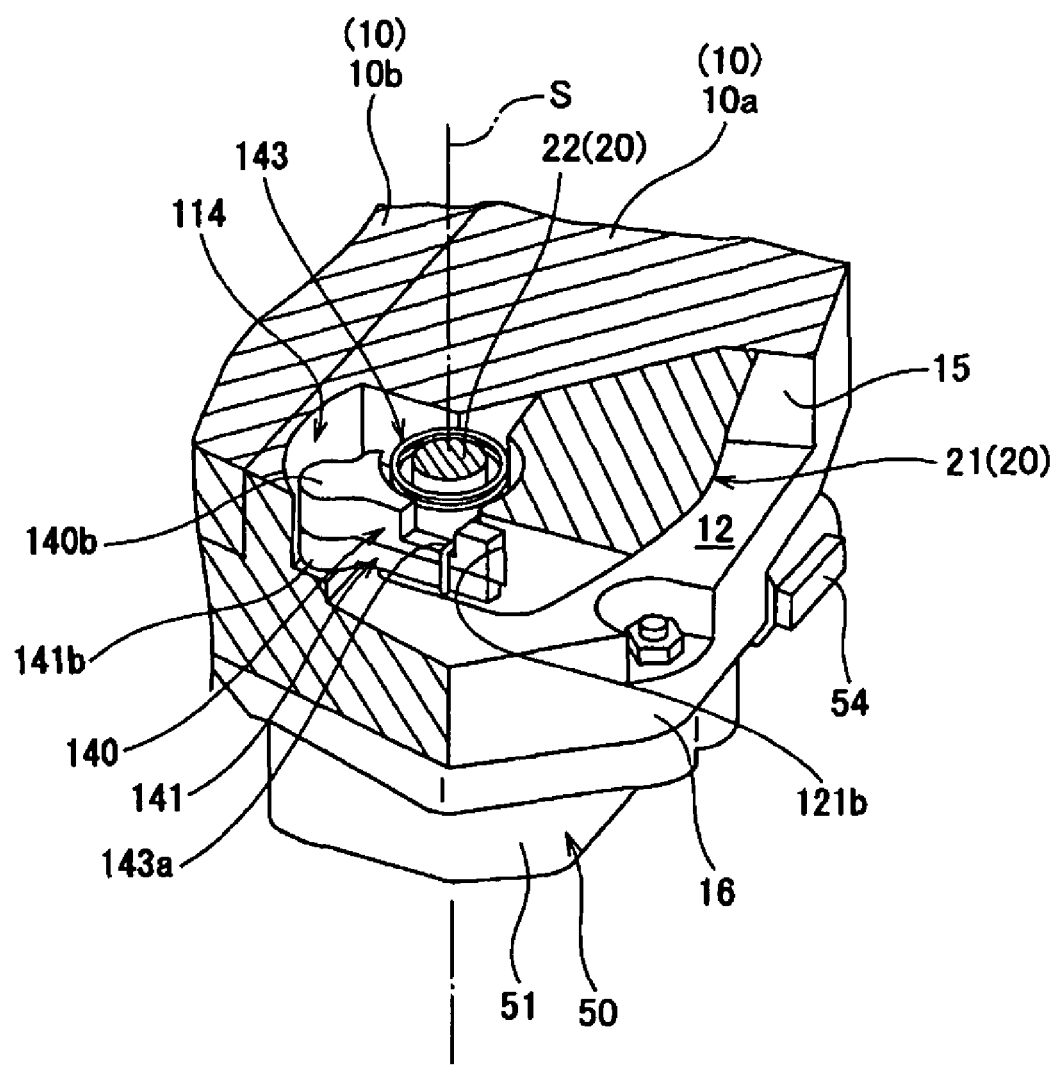
FIG. 9 is a longitudinal cross-sectional diagram indicating another embodiment of an accelerator operating device.

FIG. 9 is a longitudinal cross-sectional diagram to illustrate the inside of the accelerator operating device. FIG. 10 is a schematic diagram to illustrate the load generating mechanism included in the accelerator operating device. FIG. 11 is a characteristics diagram to indicate the characteristics of the rotational operating force of the accelerator lever.

A first inclined surface 150 is arranged at one rotational slider 140 and a second inclined surface 151 is arranged at the other rotational slider 141. A slide receiving part 114 is provided with sliding surfaces 114a, 114b on which the pair of rotational sliders 140, 141 slide respectively. The sliding surfaces are opposed to each other in the direction of the axial line S.

As illustrated in FIGS. 1 to 4, the accelerator lever 20 includes the lever main body 21, the rotational spindle that rotates integrally with the lever main body 21 and that demarcates the axial line S. The lever main body 21 includes a contacting part 121b that presses the pair of rotational sliders 140, 141 toward the opening direction. The contacting part 121b is configured to press the one rotational slider 140 to rotate therewith when the accelerator lever 20 rotates in the opening direction and to be capable of freely rotating being apart from the pair of rotational sliders 140, 141 when the accelerator lever 20 rotates in the closing direction.

The one rotational slider 140 is formed to be a roughly flat lever shape extending in the direction perpendicular to the axial line S and is provided with a sliding part 140b that slides as contacting to the sliding surface 114b of the slide receiving part 114 in the direction of the axial line S. The other rotational slider 141 is formed to be a roughly flat lever shape extending in the direction perpendicular to the axial line S and is provided with a sliding part 141b that slides as contacting to the slide surface 114b of the slide receiving part 114. The second return spring 143 is a torsion spring and is arranged around the rotational spindle 22 in the lower region of the rotation spindle 22 (between the one rotational slider 140 and the connecting part 21a of the lever main body 21). One end 143a of the second return spring 143 is retained by the pair of rotational sliders 140, 141 and the other end 143b is retained by the side wall where the concave part 12 of the body 10 is demarcated.

Then, the second return spring 143 applies rotational urging force so as to return the pair of rotational sliders 140, 141 toward the rest position corresponding to the position when the accelerator lever is at the close position, namely, so as to return the accelerator lever 20 toward the close position (rest position) via the pair of rotational sliders 140, 141.

In the abovementioned configuration, the load generating mechanism to generate a load by frictional resistance on the rotational operating force of the accelerator lever 20 is configured to include the first inclined surface 150 of the one rotational slider 140 capable of rotating by being pressed by opening rotation of the accelerator lever 20, the second inclined surface 151 of the other rotational slider 141 to contact to the first inclined surface, the slide receiving part 114 that is formed at the body 10, the sliding parts 140b, 141b that slide as contacting to the slide receiving part 114, and the second return spring 143 that returns the pair of rotational sliders 140, 141 toward the rest position corresponding to the close position.

Next, operation of the abovementioned accelerator operational device will be described with reference to FIGS. 10 and 11. First, when the accelerator lever 20 is at the close position (the rest position), the accelerator lever 20 remains stopped being contacted to the stopper wall 5 of the body 10. Namely, the accelerator lever 20 is at the position indicated by "0" in FIG. 10, that is, P0 in FIG. 11. When an operator rotates the accelerator lever 20 toward the maximum open position from this state, counter force of the first return spring 30 and the second return spring 143 is applied. Then, the first inclined surface 150 is moved relatively against the second inclined surface 151. Accordingly, the pair of rotational sliders 140, 141 become to slide on the slide receiving part 114 (the sliding surfaces 114a, 114b) at θ2 which is indicated by a dotted-line in FIG. 10 and P1 in FIG. 11, so that the friction force is generated. The friction force is exerted as gradually increasing in accordance with variation of the rotation angle θ toward θmax which is indicated by a dashed line in FIG. 10 and P2 in FIG. 11. Meanwhile, the rotational operation force varies as indicated by P3, P4 and P0 in FIG. 11 in accordance with returning of the accelerator lever toward the rest position. Since the rotational operation force is set to have the hysteresis characteristics as being large when opening and as being small when closing, the operator can comfortably perform the accelerator operation.

In the abovementioned embodiment, since the first inclined surface and the second inclined surface relatively move in accordance with opening rotation of the accelerator lever, the friction force generated between the slide receiving part 114 and the pair of rotational sliders 140, 141 varies. Therefore, the biasing spring 42 to press the rotation sliders 140, 141 toward the slid receiving part 114 can be eliminated, so that the hysteresis can be controlled with a simple configuration. Then, when the accelerator lever rotates in the direction to return to the rest position, the first inclined surface and the second inclined surface are to be in the positional relation by the second return spring 143 before the relative movement occurs. Accordingly, the friction force with the slide receiving part 114 disappears and large hysteresis characteristics can be obtained.

In the above embodiments, as indicated in FIG. 5 and FIG. 7, the slide receiving part 14 was indicated by slide surfaces 14a and 14b formed such that the gap between the pair of rotational sliders 40 and 41 changes corresponding to the opening rotation and closing rotation of the accelerator lever 20, but the slide receiving part is not limed to that, and two slide surfaces having a fixed gap without relationship to the rotational angle of the accelerator lever 20 may be employed.

In the above embodiments, the opening sensor was indicated by a non-contact type magnetic sensor, but the opening sensor is not limited to that, and a contact type resistance sensor or the like may be employed.

In the above embodiments, the pair of rotational sliders was indicated by the rotational sliders 40 and 41 that were formed in a roughly flat lever shape, but the sliders are not limited to that, and a pair of rotational slides having other shapes may be employed.

In the above embodiments, the rotational sliders were indicated by a pair of rotational sliders 40 and 41, but the rotational sliders are not limited to that, and one rotational slider may be employed.

As described above, the accelerator operating device of the present invention may of course be applied to a two-wheeled vehicle and the like, and is also useful in vehicles other than two-wheeled vehicles if a drive-by-wire system is employed because, while making the assembly and maintenance tasks easier by simplifying the structure, miniaturizing, and reducing the number of parts, unpleasant feeling can be resolved by exerting a desirable load on the rotational operating force; hysteresis characteristics can be provided to the rotational operating force corresponding to the opening rotation and closing rotation; and failsafe functions can be further guaranteed.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An accelerator operating device positioned on a handlebar, the accelerator operating device comprising:
    a body fixed to the handlebar;
    an accelerator lever that is supported on the body so as to rotate freely around a predetermined axial line and that rotates between a close position and a maximum open position;
    a first return spring that returns the accelerator lever to the close position; and
    a load generation mechanism that generates a load on a rotational operating force of the accelerator lever by frictional resistance, the load generating mechanism including
        a rotational slider that is arranged to freely rotate around the axial line and that can be pressed and rotated by opening rotation of the accelerator lever;
        a slide receiving part that is formed in the body and that makes contact with and allows the rotational slider to slide;
        a biasing spring that biases the rotational slider toward the slide receiving part; and
        a second return spring that returns the rotational slider to a rest position corresponding to the close position.

2. The accelerator operating device according to claim 1, wherein the rotational slider includes a pair of rotational sliders that are arranged mutually opposing in the axial direction and that contact the slide receiving part in the axial direction, and
    the slide receiving part is formed so as to change a gap between the pair of rotational sliders, in accordance with the opening rotation and closing rotation of the accelerator lever.

3. The accelerator operating device according to claim 2, wherein the accelerator lever includes a rotational spindle that rotates integrally and demarcates the axial line, and
    the first return spring and second return spring are torsion springs respectively arranged around the rotational spindle.

4. The accelerator operating device according to claim 3, further including an opening degree sensor that detects the degree of opening of the accelerator lever, the opening degree sensor including
    a moveable part that rotates integrally with the rotational spindle, and
    a fixing part that is fixed to the body.

5. The accelerator operating device according to claim 4, wherein the biasing spring is a compression coil spring,
    one of the pair of rotational sliders includes a guide spindle to which the coil spring is fitted, and
    the other of the pair of rotational sliders includes a through hole into which a tip part of the guide spindle can be inserted.

6. The accelerator operating device according to claim 2, wherein the slide receiving part includes a convex part onto which the rotational slider advances to locally increase the rotational operation force.

7. The accelerator operating device according to claim 3, wherein the slide receiving part includes a convex part onto which the rotational slider advances to locally increase the rotational operation force.

8. The accelerator operating device according to claim 4, wherein the slide receiving part includes a convex part onto which the rotational slider advances to locally increase the rotational operation force.

9. The accelerator operating device according to claim 5, wherein the slide receiving part includes a convex part onto which the rotational slider advances to locally increase the rotational operation force.

10. An accelerator operating device positioned on a handlebar, the accelerator operating device comprising:
    a body fixed to the handlebar;
    an accelerator lever that is supported on the body so as to rotate freely around a predetermined axial line and that rotates between a close position and a maximum open position;
    a first return spring that returns the accelerator lever to the close position; and
    a load generation mechanism that generates a load on a rotational operating force of the accelerator lever by frictional resistance,
    wherein the load generating mechanism includes
        a pair of rotational sliders that are arranged to freely rotate around the axial line and that can be pressed and rotated by opening rotation of the accelerator lever, a slide receiving part that is formed in the body and that makes contact respectively with and allows the pair of rotational sliders to slide, and a second return spring that returns the pair of rotational sliders to a rest position corresponding to the close position, wherein one of the pair of rotational sliders includes a first inclined surface having a predetermined angle against the sliding direction and the other of the pair of rotational sliders includes a second inclined surface being contacted to the first inclined surface, the pair of rotational sliders includes a pair of sliding parts that are respectively contacted to the slide receiving part, and the pair of sliding parts are configured that distance therebetween becomes large due to relative movement of the first inclined surface and the second inclined surface in opening rotation direction in accordance with the rotation of the pair of rotational sliders being pressed by the opening rotation of the accelerator lever.

* * * * *